United States Patent
Choi et al.

(10) Patent No.: US 11,581,522 B2
(45) Date of Patent: Feb. 14, 2023

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Hyun Jong Yu, Cheongju-si (KR); Seung Hyun Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 105 days.

(21) Appl. No.: 17/337,622

(22) Filed: Jun. 3, 2021

(65) Prior Publication Data

US 2021/0288309 A1 Sep. 16, 2021

Related U.S. Application Data

(62) Division of application No. 16/537,459, filed on Aug. 9, 2019, now Pat. No. 11,063,247.

(30) Foreign Application Priority Data

Aug. 22, 2018 (KR) .................. 10-2018-0098186
Sep. 18, 2018 (KR) .................. 10-2018-0111347
Mar. 29, 2019 (KR) .................. 10-2019-0036986
Mar. 29, 2019 (KR) .................. 10-2019-0037016

(51) Int. Cl.
| | | |
|---|---|---|
| *H01M 4/131* | (2010.01) | |
| *H01M 4/505* | (2010.01) | |
| *H01M 10/0525* | (2010.01) | |
| *H01M 4/485* | (2010.01) | |
| *H01M 4/02* | (2006.01) | |

(52) U.S. Cl.
CPC ........... *H01M 4/131* (2013.01); *H01M 4/485* (2013.01); *H01M 4/505* (2013.01); *H01M 10/0525* (2013.01); *H01M 2004/028* (2013.01)

(58) Field of Classification Search
CPC ....... H01M 4/131; H01M 4/485; H01M 4/505
USPC ................................................ 429/231.95
See application file for complete search history.

(56) References Cited

U.S. PATENT DOCUMENTS

| | | | |
|---|---|---|---|
| 2016/0218364 A1* | 7/2016 | Sakai | H01M 4/525 |
| 2018/0205084 A1* | 7/2018 | Ham | H01M 4/366 |
| 2018/0212237 A1 | 7/2018 | Lee et al. | |
| 2018/0233739 A1 | 8/2018 | Park et al. | |
| 2018/0294477 A1* | 10/2018 | Shin | H01M 4/62 |

FOREIGN PATENT DOCUMENTS

| | | |
|---|---|---|
| EP | 3 226 330 A1 | 10/2017 |
| EP | 3 282 506 A1 | 2/2018 |
| EP | 3 331 067 A1 | 6/2018 |
| JP | 2014-038828 A | 2/2014 |

(Continued)

OTHER PUBLICATIONS

The European search report dated Feb. 4, 2020 by the European Patent Office, which corresponds to European Patent Application No. 19190953.0 and is related to U.S. Appl. No. 16/537,459.

*Primary Examiner* — James M Erwin
(74) *Attorney, Agent, or Firm* — Studebaker & Brackett PC (57) ABSTRACT

The present invention relates to a positive electrode active material and a lithium secondary battery comprising the same.

10 Claims, 8 Drawing Sheets

(56) References Cited

FOREIGN PATENT DOCUMENTS

| | | |
|---|---|---|
| JP | 2017-134996 A | 8/2017 |
| JP | 2018-533157 A | 11/2018 |
| JP | 2018-534734 A | 11/2018 |
| KR | 10-2013-0108717 A | 10/2013 |
| KR | 10-2013-0117340 A | 10/2013 |
| KR | 10-2017-0063395 A | 6/2017 |
| KR | 10-2017-0063407 A | 6/2017 |
| KR | 10-2017-0075654 A | 7/2017 |
| KR | 10-2018-0057864 A | 5/2018 |
| WO | 2017/095133 A1 | 6/2017 |
| WO | 2017/095134 A1 | 6/2017 |

* cited by examiner

POSITIVE ELECTRODE ACTIVE MATERIAL AND LITHIUM SECONDARY BATTERY COMPRISING THE SAME

CROSS-REFERENCE TO RELATED APPLICATIONS

This application is a Divisional of U.S. patent application Ser. No. 16/537,459 filed Aug. 9, 2019, which claims priority to and the benefit of Korean Patent Application No. 10-2018-0098186 filed Aug. 22, 2018, Korean Patent Application No. 10-2018-0111347 filed Sep. 18, 2018, Korean Patent Application No. 10-2019-0036986 filed Mar. 29, 2019, and Korean Patent Application No. 10-2019-0037016 filed Mar. 29, 2019, the disclosure of which is incorporated herein by reference in its entirety.

BACKGROUND

1. Field of the Invention

The present invention relates to a positive electrode active material and a lithium secondary battery comprising the same.

2. Discussion of Related Art

Batteries store electrical power by using materials facilitating an electrochemical reaction with a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, while $LiCoO_2$ is most widely used due to excellent lifespan characteristics and charge/discharge efficiency, it is expensive because of the resource limit of cobalt used as a raw material, and has a disadvantage that price competitiveness is limited.

Lithium manganese oxides such as $LiMnO_2$, $LiMn_2O_4$, etc. have advantages of excellent thermal safety and low costs, but also have problems of small capacity and poor high-temperature characteristics. In addition, while a $LiNiO_2$-based positive electrode active material exhibits a battery characteristic of high discharge capacity, due to cation mixing between Li and a transition metal, it is difficult to synthesize the $LiNiO_2$-based positive electrode active material, thereby causing a greater problem in rate characteristic.

In addition, depending on the intensification of such cation mixing, a large amount of Li by-products is generated, and since most of the Li by-products consist of a compound of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles, and also leads to the swelling of a battery.

SUMMARY OF THE INVENTION

To solve problems of a conventional positive electrode active material for a lithium secondary battery, the present invention is directed to providing a positive electrode active material which is capable of improving high-temperature storage stability and lifespan characteristics by increasing the structural stability of the positive electrode active material.

The present invention is also directed to providing a lithium secondary battery using a positive electrode including the positive electrode active material defined herein.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

One aspect of the present invention provides a positive electrode active material, which includes a lithium composite oxide including primary particles and secondary particles formed by agglomerating the primary particles, and at least one lithium alloy oxide represented by Formula 1 below and existing at least a part of a) the interface between the primary particles and b) the surface of the secondary particle.

$$Li_aM1_bO_c \qquad \text{[Formula 1]}$$

(wherein, M1 is at least one selected from Ti, Zr, Mg, V, B, Mo, Zn, Nb, Ba, Ta, Fe, Cr, Sn, Hf, Ce, W, Nd and Gd, $0 \le a \le 6$, $0 < b \le 6$, and $0 < c \le 10$)

A positive electrode active material according to an exemplary embodiment of the present invention includes at least one lithium alloy oxide existing at least a part of a) the interface between the primary particles and b) the surface of the secondary particle, thereby increasing structural stability, and thus high-temperature storage stability and lifespan characteristics may be improved.

In one exemplary embodiment, the lithium alloy oxide may have a concentration gradient which decreases from the surface to the center of the secondary particle, thereby preventing the overall structural collapse of the positive electrode active material during an electrochemical reaction by a lithium alloy oxide.

Another aspect of the present invention provides a positive electrode slurry composition, which includes the above-described positive electrode active material, a conductive material and a binder.

Still another aspect of the present invention provides a lithium secondary battery comprising a positive electrode including the above-described positive electrode active material.

DETAILED DESCRIPTION OF EXEMPLARY EMBODIMENTS

The above objects, features and advantages of the present invention will be described in detail with reference to the accompanying drawings, and therefore, the technical idea of the present invention will be easily implemented by those of ordinary skill in the art. To explain the present invention, when detailed description on the related art is determined to unnecessarily obscure the subject matter of the present invention, the detailed description will be omitted.

Hereinafter, a positive electrode active material and a lithium secondary battery including the same according to the present invention will be described in further detail.

One aspect of the present invention provides a positive electrode active material, which includes a lithium composite oxide including primary particles and secondary particles formed by agglomerating the primary particles, and a lithium alloy oxide.

In the present invention, the lithium composite oxide may be defined as the primary particles and particles including an agglomerate formed by agglomerating (physically bonding) a plurality of the primary particles. The primary particles may have a rod shape, an oval shape and/or an irregular shape.

The primary particles may come into contact with neighboring primary particles, thereby forming an interface or grain boundary between the primary particles. In addition, the primary particles may be spaced apart from neighboring primary particles in the secondary particle, and thus an inner pore may be formed.

Here, the primary particles may come into contact with the inner pore without a grain boundary formed by coming into contact with neighboring primary particles, such that a surface may be formed in the secondary particle. Meanwhile, a surface at which the primary particles present at the outermost surface of the secondary particle are exposed to the outside air forms the surface of the secondary particle.

In one exemplary embodiment, the positive electrode active material may include the lithium alloy oxide existing at least a part of a) the interface between the primary particles, which constitute the lithium composite oxide, and b) the surface of the secondary particle.

The lithium alloy oxide may be physically and/or chemically combined with the primary particles forming the lithium composite oxide and/or the secondary particles.

Here, the lithium alloy oxide may be used to entirely or partially coat the interface between the primary particles forming the lithium composite oxide and the surface of the secondary particle, and in some cases, the lithium alloy oxide may be distributed in a particle phase entirely or partially at the interface between the primary particles forming the lithium composite oxide and the surface of the secondary particle.

Accordingly, the positive electrode active material according to the exemplary embodiment includes the above-described lithium alloy oxide, thereby increasing structural stability, and when the positive electrode active material is used in a lithium secondary battery, high-temperature storage stability and lifespan characteristics of the positive electrode active material may be improved. In addition, the lithium alloy oxide may serve as a migration pathway of lithium ions in the positive electrode active material, and thus affect the improvement of the efficiency of the lithium secondary battery.

In addition, in some cases, the lithium alloy oxide may be present in the inner pore formed inside the secondary particles as well as at at least a part of the interface between the primary particles, which form the lithium composite oxide, and the surface of the secondary particle.

Here, the lithium alloy oxide may be represented by Formula 1 below.

$$Li_aM1_bO_c \quad \text{[Formula 1]}$$

(wherein, M1 is at least one selected from Ti, Zr, Mg, V, B, Mo, Zn, Nb, Ba, Ta, Fe, Cr, Sn, Hf, Ce, W, Nd and Gd, $0 \leq a \leq 6$, $0 < b \leq 6$, and $0 < c \leq 10$)

As shown in Formula 1, the lithium alloy oxide is an oxide formed by complexing lithium and a metal element represented as M1, and may be, for example, Li(W)O, Li(Zr)O, Li(Ti)O, Li(B)O, WO$_N$, ZrO$_x$, or TiO$_x$. However, although the above examples are merely provided for convenience of understanding, the lithium alloy oxide defined in the present invention is not limited to the above examples. Therefore, in experimental examples to be described below, for convenience, experimental results for some examples of a representative lithium alloy oxide that can be represented by Formula 1 are described.

In another exemplary embodiment, the lithium alloy oxide may be an oxide prepared by complexing lithium and at least two types of metal elements represented as M1, or may further include an oxide prepared by complexing lithium and at least two types of metal elements represented as M1. The lithium alloy oxide prepared by complexing lithium and at least two types of metal elements represented as M1 may be, for example, Li(W/Ti)O, Li(W/Zr)O, Li(W/Ti/Zr)O, or Li(W/Ti/B)O, but the present invention is not necessarily limited thereto.

In addition, in this case, the lithium tungsten oxide may have a lattice structure that is doped with at least one metal element represented as at least one type of M1. That is, the lithium alloy oxide may have a lattice structure in which tungsten in the lattice structure formed by the lithium tungsten oxide (e.g., Li$_2$WO$_4$, Li$_2$W$_2$O$_7$, Li$_4$WO$_5$, Li$_6$WO$_6$ or Li$_6$W$_2$O$_9$) is partially substituted with an M1 element.

Here, the lithium alloy oxide in which a part of tungsten atoms in the lattice structure formed of the lithium tungsten oxide is substituted with an M1 element may be represented by Formula 1-1 below.

$$Li_a(W_{1-y}M1_y)O_c \quad \text{[Formula 1-1]}$$

(wherein, M1 includes at least one selected from Ti, Zr, Mg, V, B, Mo, Zn, Nb, Ba, Ta, Fe, Cr, Sn, Hf, Ce, Nd and Gd, $0 < a \leq 6$, $0 < b \leq 6$, $0 < c \leq 10$, and $0 < y \leq 0.50$)

In one exemplary embodiment, the lithium alloy oxide may have a concentration gradient which decreases from the surface to the center of the secondary particle constituting the lithium composite oxide. Accordingly, the concentration of the lithium alloy oxide may be reduced from the outermost surface to the center of the secondary particle.

As described above, as the lithium alloy oxide has a concentration gradient which decreases from the surface to the center of the secondary particle constituting the lithium composite oxide, residual lithium present at the surface of the positive electrode active material is effectively reduced, thereby preventing a side reaction by the unreacted residual lithium beforehand, and also preventing the crystallinity in the inside of the surface of the positive electrode active material from being lowered by the lithium alloy oxide. In addition, the collapse of the entire structure of the positive electrode active material during an electrochemical reaction may be prevented by the lithium alloy oxide.

In another exemplary embodiment, the lithium alloy oxide may include a first alloy oxide represented by Formula 2 below and a second lithium alloy oxide represented by Formula 3 below.

[Formula 2]

(wherein, $0 \leq d \leq 6$, $0 < e \leq 6$, $0 < f \leq 10$)

[Formula 3]

(wherein, M2 is at least one selected from Ti, Zr, Mg, V, B, Mo, Zn, Nb, Ba, Ta, Fe, Cr, Sn, Hf, Ce, Nd and Gd, $0 \leq g \leq 6$, $0 < h \leq 6$, and $0 < i \leq 10$)

Here, the first lithium alloy oxide and the second lithium alloy oxide may exhibit a concentration gradient that decreases from the surface to the center of the secondary particle forming the lithium composite oxide. Accordingly, the concentration of the lithium alloy oxide may decrease from the outermost surface to the center of the secondary particle.

Here, it is preferable that the reduction rate of the concentration of the second lithium alloy oxide be higher than that of the first lithium alloy oxide, and as the reduction rate of the concentration of the second lithium alloy oxide is higher than that of the first lithium alloy oxide, the structural stability of the positive electrode active material including the lithium alloy oxide may be maintained. In addition, an efficient migration pathway of lithium ions in the positive electrode active material is created, and thus a positive effect on improvement in the efficiency of a lithium secondary battery can be imparted.

Therefore, when positive electrodes including a positive electrode active material according to various exemplary embodiments of the present invention are used as a positive electrode of a lithium secondary battery, high-temperature storage stability and lifespan characteristics may be more improved.

According to an additional exemplary embodiment, the second lithium alloy oxide may include a lithium zirconium oxide represented by Formula 4 below and a lithium titanium oxide represented by Formula 5 below.

[Formula 4]

(wherein, $0 \leq j \leq 6$, $0 < k \leq 6$, $0 < l \leq 10$)

[Formula 5]

(wherein, $0 \leq m \leq 6$, $0 < n \leq 6$, $0 < p \leq 10$)

The lithium zirconium oxide represented by Formula 4 and the lithium titanium oxide represented by Formula 5 may contribute to increasing the structural stability of the positive electrode active material as well as the lithium tungsten oxide represented by Formula 2, and an efficient migration pathway of lithium ions may be created in the positive electrode active material.

Here, the lithium zirconium oxide and the lithium titanium oxide may have concentration gradients that decrease from the surface to the center of the secondary particle forming the lithium composite oxide, like the lithium tungsten oxide. Therefore, the concentrations of the lithium zirconium oxide and the lithium titanium oxide may decrease from the outermost surface to the center of the secondary particle.

Here, to maintain the structural stability and crystallinity of a positive electrode active material including both of the lithium zirconium oxide and the lithium titanium oxide as well as the lithium tungsten oxide, the concentration reduction rate of the lithium zirconium oxide is preferably higher than that of the lithium titanium oxide.

Meanwhile, in the positive electrode active material according to an exemplary embodiment of the present invention, the primary particles forming the lithium composite oxide may be represented by Formula 6 below.

[Formula 6]

(wherein, M3 is at least one selected from Mn and Al, M4 is at least one selected from Ti, Zr, Mg, V, B, Mo, Zn, Nb, Ba, Ta, Fe, Cr, Sn, Hf, Ce, W, Nd and Gd, $0.5 \leq w \leq 1.5$, $0 \leq x \leq 0.50$, $0 \leq y \leq 0.20$, and $0 \leq z \leq 0.20$)

Here, the M4 element included in the primary particles present at the surface of the secondary particle may have a concentration gradient that decreases toward the center of the secondary particle.

For example, when the distance from the outermost surface to the center of the secondary particle forming the lithium composite oxide is R, the M4 elements present in the region in which the distance (R') from the outermost surface of the secondary particle ranges from 0 to 0.02R may have a concentration gradient that decreases toward the center of the secondary particle in the primary particles.

Here, the concentration variation of the M4 elements included in the primary particles present in the region in which the distance (R') from the outermost surface of the secondary particle forming the lithium composite oxide ranges from 0 to 0.02R may be 50% or more.

Here, the M4 element included in the primary particles present in the region in which the distance (R') from the outermost surface of the secondary particle forming the lithium composite oxide ranges from more than 0.02R to 1.0R may not have a concentration gradient in a way that the concentration increases or decreases in a certain direction in the primary particles. In another exemplary embodiment, the concentration variation of the M4 element in the primary particles present in the region in which the distance (R') from the outermost surface of the secondary particle forming the lithium composite oxide is more than 0.02R to 1.0R may be 49% or less, preferably, 30% or less, and more preferably, 15% or less.

Another aspect of the present invention may provide a positive electrode including a positive electrode current collector and a positive electrode active material layer formed on the positive electrode current collector. Here, the positive electrode active material layer may include any one of the positive electrode active materials according to various exemplary embodiments of the present invention. Therefore, since the positive electrode active material is the same as described above, for convenience, detailed description will be omitted, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 µm, and fine irregularities may be formed on the surface of the positive electrode current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 µm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer selectively includes a binder and a conductive material, as well as the negative electrode active material.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a migration path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

Yet another aspect of the present invention provides a battery module including the lithium secondary battery as a unit cell, and/or a battery pack including the same.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Experimental Example 1

(1) Preparation of Positive Electrode Active Material

Example 1

A spherical $Ni_{0.92}Co_{0.08}(OH)_2$ hydroxide precursor was synthesized by a co-precipitation method. In a 90 L reactor, 25 wt % NaOH and 30 wt % $NH_4OH$ were input into an aqueous 1.5M sulfuric acid solution of a transition metal complex in which $NiSO_4 \cdot 7H_2O$ and $CoSO_4 \cdot 7H_2O$ were mixed in a molar ratio of 92:8. The pH in the reactor was maintained at 11.5, the temperature of the reactor was maintained at 60° C., and an inert gas $N_2$ was added to the reactor to prevent the prepared precursor from being oxidized. After the completion of synthesis and stirring, washing and dehydration were performed using filter press (F/P) equipment, thereby obtaining a $Ni_{0.92}Co_{0.08}(OH)_2$ hydroxide precursor.

The hydroxide precursor was mixed with a Li-containing raw material LiOH and an Al-containing raw material $Al_2O_3$ using a mixer, and the resulting mixture was subjected to the following: a temperature of a calcination furnace was raised 1° C. per minute while maintaining a $O_2$ atmosphere, maintained at 350° C. for 4 hours, further raised 2° C. per minute, and then maintained at a thermal treatment temperature of 650° C. for 10 hours, followed by natural cooling. The obtained positive electrode active material was mixed with a W-containing raw material ($WO_3$) using a mixer. In the same calcination furnace, the temperature was increased 2° C. per minute while maintaining the $O_2$ atmosphere, and the furnace was maintained at a thermal treatment temperature of 600° C. for 5 hours, followed by natural cooling. Subsequently, each of thermal treatment and cooling were carried out once under the same conditions as above. The positive electrode active material prepared in Example 1 was confirmed to have a composition formula $Li_{1.0}Ni_{0.902}Co_{0.079}Al_{0.04}W_{0.005}O_2$.

Example 2

A positive electrode active material was prepared by the same method as described in Example 1, except that a W-containing raw material ($WO_3$) and a cobalt-containing raw material ($Co(OH)_2$) were mixed such that the positive electrode active material obtained in Example 2 has a composition formula $Li_{1.04}Ni_{0.897}Co_{0.084}Al_{0.014}W_{0.005}O_2$.

Example 3

A positive electrode active material was prepared by the same method as described in Example 1, except that a W-containing raw material ($WO_3$) and a magnesium-containing raw material ($Mg(OH)_2$) were mixed such that the positive electrode active material obtained in Example 3 has a composition formula $Li_{1.04}Ni_{0.897}Co_{0.079}Al_{0.014}W_{0.005}Mg_{0.005}O_2$.

Example 4

A positive electrode active material was prepared by the same method as described in Example 1, except that a W-containing raw material ($WO_3$) and a manganese-containing raw material ($Mn(OH)_2$) were mixed such that the positive electrode active material obtained in Example 4 has a composition formula $Li_{1.04}Ni_{0.897}Co_{0.079}Al_{0.014}W_{0.005}Mn_{0.005}O_2$.

Example 5

A positive electrode active material was prepared by the same method as described in Example 1, except that a W-containing raw material ($WO_3$) and a titanium-containing raw material ($TiO_2$) were mixed such that the positive electrode active material obtained in Example 5 has a composition formula $Li_{1.04}Ni_{0.901}Co_{0.079}Al_{0.014}W_{0.005}Ti_{0.001}O_2$.

Example 6

A positive electrode active material was prepared by the same method as described in Example 1, except that a W-containing raw material ($WO_3$) and a Zr-containing raw material ($ZrO_2$) were mixed such that the positive electrode active material obtained in Example 6 has a composition formula $Li_{1.04}Ni_{0.901}Co_{0.079}Al_{0.014}W_{0.005}Ti_{0.001}O_2$.

Example 7

A positive electrode active material was prepared by the same method as described in Example 1, except that a W-containing raw material ($WO_3$), a Ti-containing raw material ($TiO_2$) and a Zr-containing raw material were mixed such that the positive electrode active material obtained in Example 7 has a composition formula $Li_{1.04}Ni_{0.901}Co_{0.078}Al_{0.014}W_{0.005}Ti_{0.001}Zr_{0.001}O_2$.

Example 8

A positive electrode active material was prepared by the same method as described in Example 1, except that the positive electrode active material prepared in Example 1 was mixed with a W-containing raw material (WO$_3$) and thermally treated once at 600° C.

Comparative Example 1

A positive electrode active material was prepared by the same method as described in Example 1, except that the positive electrode active material prepared in Example 1 was not mixed with a W-containing raw material (WO$_3$).

Comparative Example 2

A Ni$_{0.92}$Co$_{0.08}$(OH)$_2$ hydroxide precursor was mixed with a Li-containing raw material LiOH and an Al-containing raw material Al$_2$O$_3$ using a mixer, and the resulting mixture was subjected to the following: a temperature of a calcination furnace was raised 1° C. per minute while an O$_2$ atmosphere was maintained, and maintained at a thermal treatment temperature of 650° C. for 10 hours, followed by natural cooling.

The obtained positive electrode active material was mixed with a W-containing raw material (WO$_3$) using a mixer. In the same calcination furnace, the temperature was increased 2° C. per minute while maintaining the O$_2$ atmosphere, and the furnace was maintained at a thermal treatment temperature of 700° C. for 5 hours, followed by natural cooling. Subsequently, each of thermal treatment and cooling were carried out once under the same conditions as above, thereby preparing a positive electrode active material.

Comparative Example 3

A positive electrode active material was prepared by the same method as described in Comparative Example 2, except that the positive electrode active material of Comparative Example 2 and a W-containing raw material (WO$_3$) were mixed and thermally treated once at 700° C.

Comparative Example 4

A Ni$_{0.92}$Co$_{0.08}$(OH)$_2$ hydroxide precursor was mixed with a Li-containing raw material LiOH and an Al-containing raw material Al$_2$O$_3$ using a mixer, and the resulting mixture was subjected to the following: a temperature of a calcination furnace was raised 1° C. per minute while an O$_2$ atmosphere was maintained, and maintained at a thermal treatment temperature of 650° C. for 10 hours, followed by natural cooling.

The obtained positive electrode active material was mixed with a W-containing raw material (WO$_3$) and a Ti-containing raw material (TiO$_2$) using a mixer. In the same calcination furnace, the temperature was increased 2° C. per minute while maintaining the O$_2$ atmosphere, and the furnace was maintained at a thermal treatment temperature of 700° C. for 5 hours and naturally cooled, thereby obtaining a positive electrode active material.

Comparative Example 5

A Ni$_{0.92}$Co$_{0.08}$(OH)$_2$ hydroxide precursor was mixed with a Li-containing raw material LiOH and an Al-containing raw material Al$_2$O$_3$ using a mixer, and the resulting mixture was subjected to the following: a temperature of a calcination furnace was raised 1° C. per minute while an O$_2$ atmosphere was maintained, and maintained at a thermal treatment temperature of 650° C. for 10 hours, followed by natural cooling.

The obtained positive electrode active material was mixed with a W-containing raw material (WO$_3$) and a Zr-containing raw material (ZrO$_2$) using a mixer. In the same calcination furnace, the temperature was increased 2° C. per minute while maintaining the O$_2$ atmosphere, and the furnace was maintained at a thermal treatment temperature of 700° C. for 5 hours and naturally cooled, thereby preparing a positive electrode active material.

(2) TEM/EDS Analyses for Positive Electrode Active Material

Figure 3:
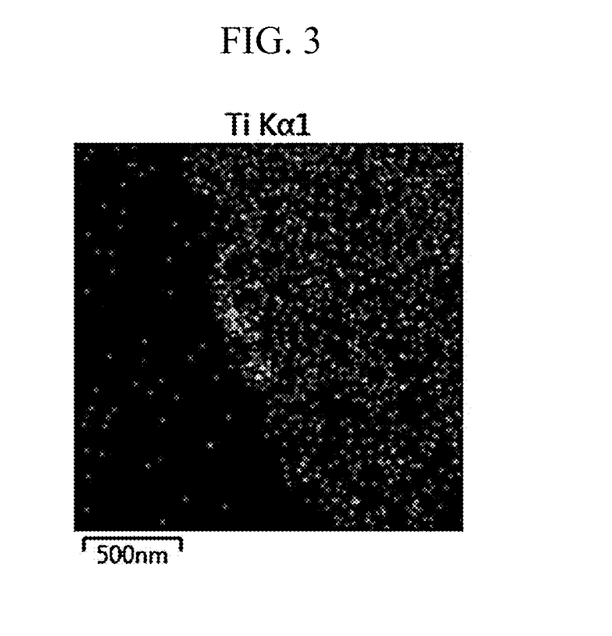
Figure 4:
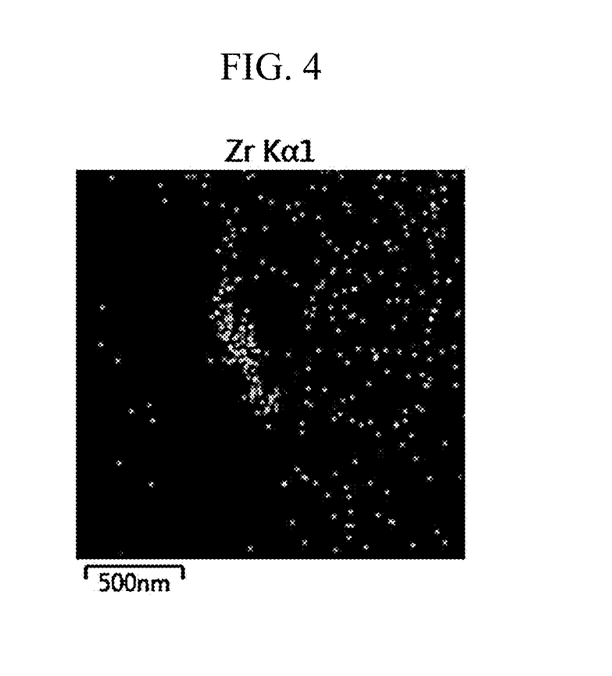
Figure 5:
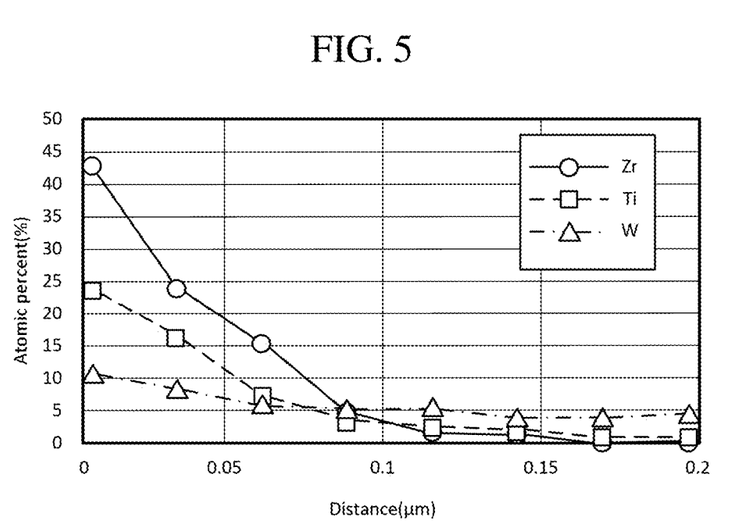
FIG. 5 is a graph (line sum spectrum) showing contents of doping metal elements (Zr, Ti and W) measured according to the results of TEM/EDS mapping for a positive electrode active material prepared according to an exemplary embodiment of the present invention.

FIGS. 1 to 4 show the results of TEM analysis and TEM/EDS mapping for a positive electrode active material prepared according to Example 7, and FIG. 5 shows a graph (line sum spectrum) showing the contents of doping metal elements (Zr, Ti and W) measured according to the TEM/EDS mapping results.

Figure 1:
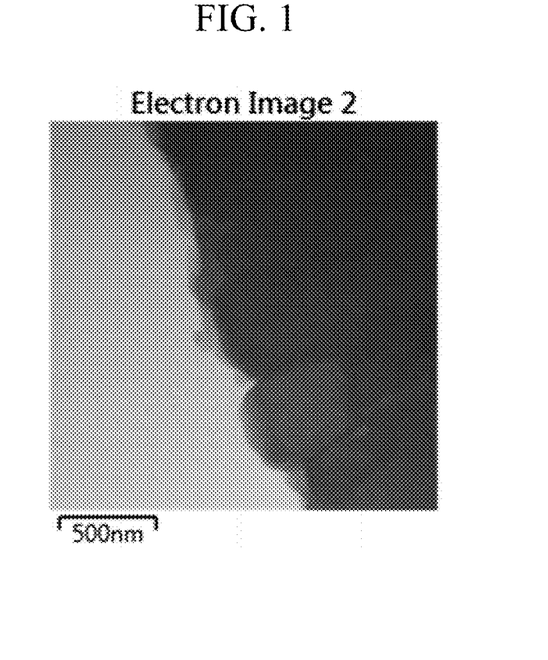
FIGS. 1 to 4 are the results of transmission electron microscopy (TEM) analyses and TEM/EDS mapping for a positive electrode active material prepared according to an exemplary embodiment of the present invention, respectively. In the TEM/EDS mapping results shown in FIGS. 2 to 4, light dots represent regions of corresponding metal elements.
Figure 2:
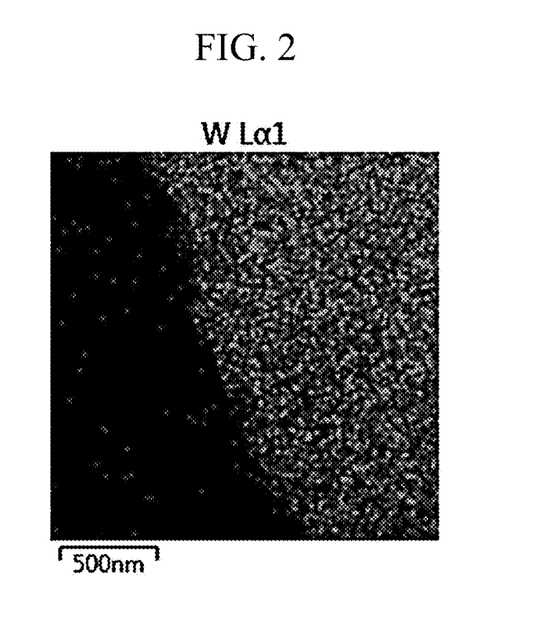

FIG. 1 shows a part from the outermost surface of the positive electrode active material prepared in Example 7, and FIGS. 2 to 4 show the distribution of W, Ti and Zr present in the positive electrode active material shown in FIG. 1, respectively.

Referring to FIGS. 2 to 4, it can be confirmed that W, Ti and Zr in the positive electrode active material prepared in Example 7 have concentration gradients which decrease from the surface to the center of the secondary particle.

In addition, referring to FIG. 5, it can be confirmed that Ti and Zr have higher concentration reduction rates than W at the surface of the secondary particle, and the Zr concentration reduction rate at the surface of the secondary particle is higher than that of Ti.

It can be expected that the result shown in FIG. 5 is affected by the concentration gradient of a lithium alloy oxide (lithium tungsten oxide, lithium titanium oxide, or lithium zirconium oxide) existing at least a part of the surface of the secondary particle formed by agglomerating the primary particles, as well as those of W, Ti and Zr in the secondary particles forming the lithium composite oxide.

Although separate drawings are not attached, from the TEM/EDS mapping results, it can be confirmed that all of the positive electrode active materials prepared according to Examples 1 to 6 have a concentration gradient of a lithium alloy oxide, which decreases from the surface to the center of a secondary particle forming the positive electrode active material.

Figure 6:
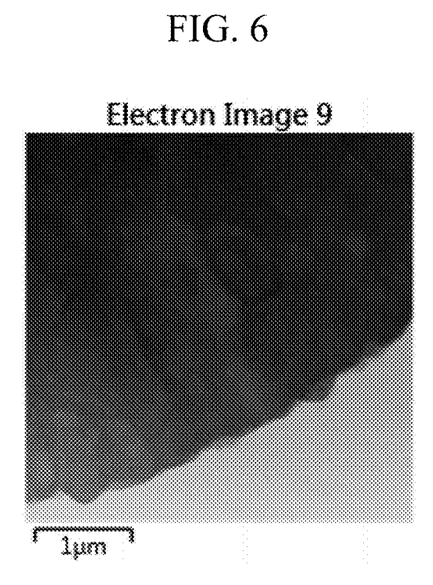
FIGS. 6 to 9 show the results of TEM analyses and TEM/EDS mapping for positive electrode active materials prepared according to Comparative Examples. In the TEM/EDS mapping results shown in FIGS. 7 to 9, light dots represent regions of corresponding metal elements.
Figure 7:
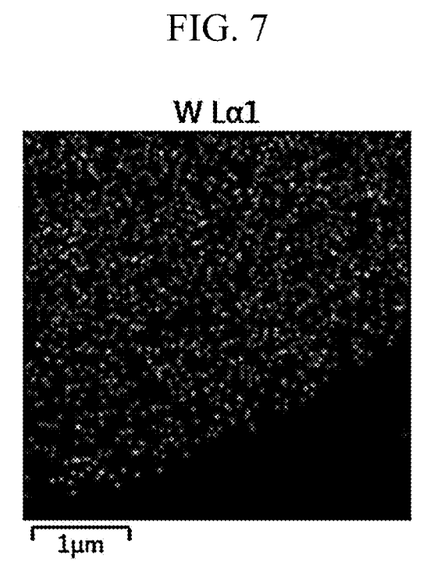

FIGS. 6 and 7 show the results of TEM analysis and TEM/EDS mapping for the positive electrode active material prepared in Comparative Example 3.

FIG. 6 shows a part from the outermost surface of the positive electrode active material prepared according to Comparative Example 3, and FIG. 7 shows the distribution of W present in the positive electrode active material shown in FIG. 6.

Referring to FIGS. 6 and 7, it can be confirmed that, unlike the positive electrode active material according to Example 7, shown in FIGS. 1 to 4, W in the positive electrode active material does not have a concentration gradient which decreases from the surface to the center of the secondary particle. Accordingly, in the case of the positive electrode active material prepared according to Comparative Example 3, it can be expected that there is almost no concentration gradient of a lithium tungsten oxide existing at least a part of a) the interface between primary particles forming the lithium composite oxide and b) the surface of a secondary particle formed by agglomerating the primary particles.

Likewise, although separate drawings are not attached, the positive electrode active material prepared according to Comparative Example 2 could not have a concentration gradient of a lithium alloy oxide, which decreases from the surface to the center of a secondary particle forming a positive electrode active material as shown in Comparative Example 3.

Figure 8:
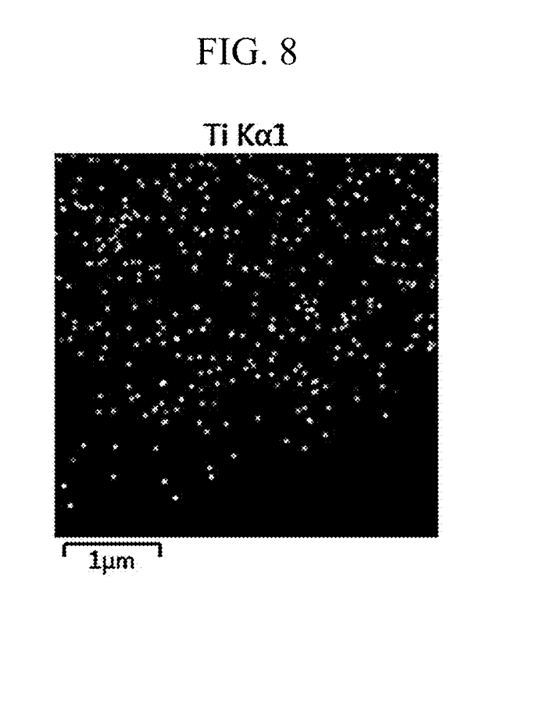

FIG. 8 shows the result of TEM/EDS mapping for Ti present in a positive electrode active material prepared according to Comparative Example 4.

Referring to FIG. 8, unlike a positive electrode active material according to Example 7 shown in FIGS. 1 to 4, it can be confirmed that Ti in the positive electrode active materials does not exhibit a concentration gradient which decreases from the surface to the center of a secondary particle. Accordingly, in the case of a positive electrode active material prepared according to Comparative Example 4, it can be expected that there is almost no concentration gradient of a lithium titanium oxide existing at least a part of a) the interface between primary particles forming a lithium composite oxide and b) the surface of a secondary particle formed by agglomerating the primary particles.

Figure 9:
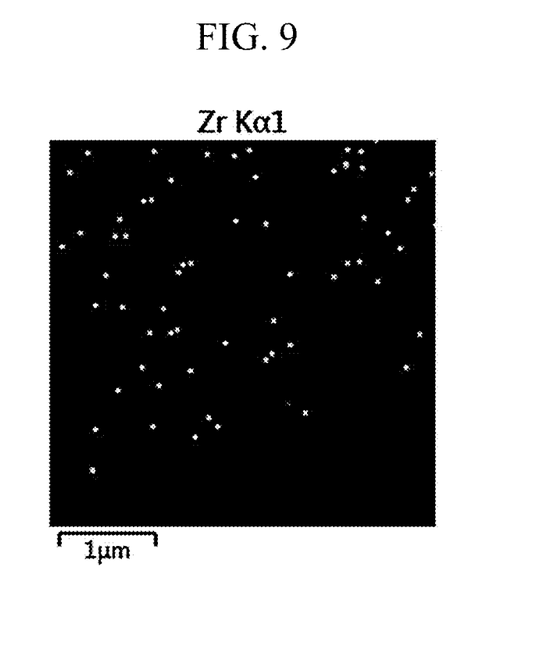

FIG. 9 shows the result of TEM/EDS mapping for Zr present in a positive electrode active material prepared according to Comparative Example 5.

Referring to FIG. 9, unlike the positive electrode active material according to Example 7 shown in FIGS. 1 to 4, it can be confirmed that Zr in the positive electrode active material does not exhibit a concentration gradient which decreases from the surface to the center of a secondary particle. Accordingly, in the case of a positive electrode active material according to Comparative Example 5, it can be expected that there is almost no concentration gradient of lithium zirconium oxide existing at least a part of a) the interface between primary particles forming a lithium composite oxide and b) the surface of a secondary particle formed by agglomerating the primary particles.

(3) XRD Analysis of Positive Electrode Active Material

X-ray diffraction (XRD) analyses were performed for positive electrode active materials prepared according to the Examples and Comparative Examples to confirm whether a lithium alloy oxide is present or not in the positive electrode active material. The XRD analyses were performed using a Bruker D8 Advance diffractometer with Cu Kα radiation (1.540598 Å).

Figure 10:
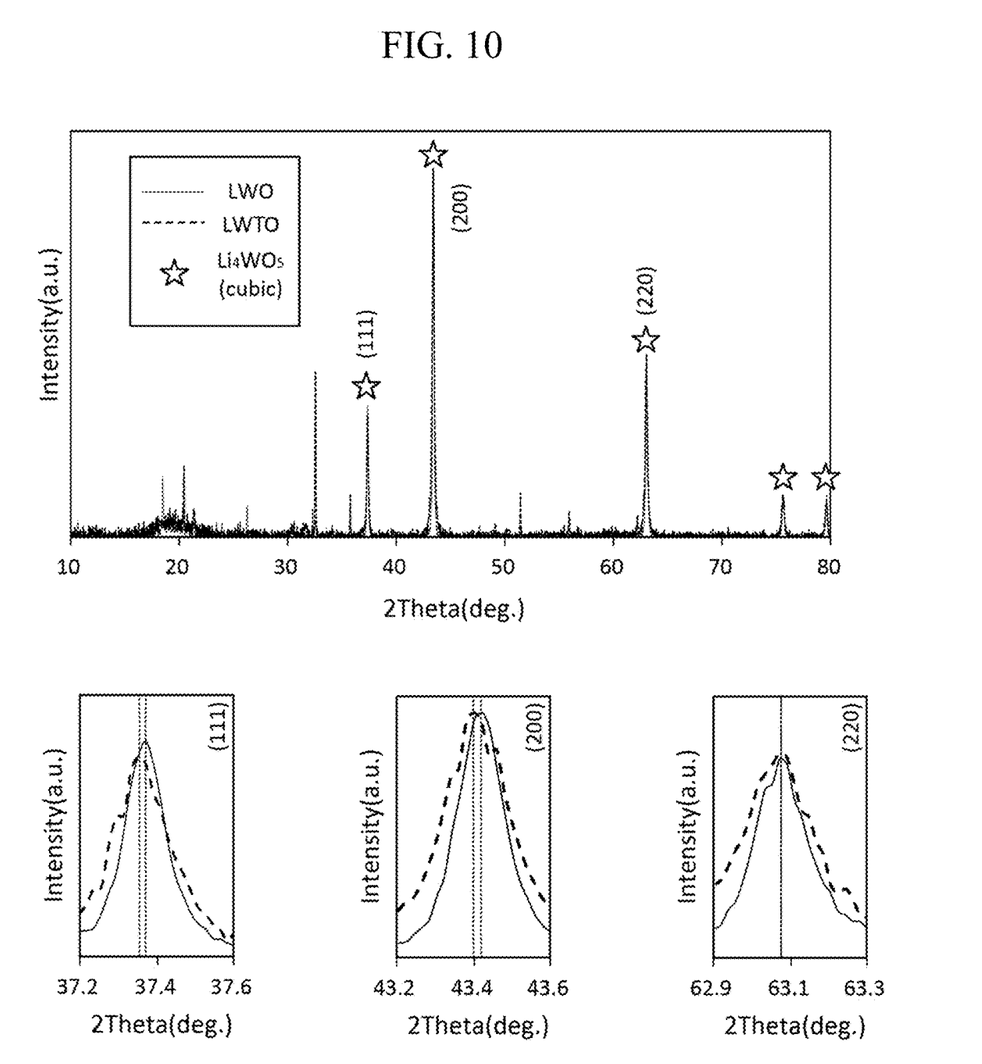
FIGS. 10 to 12 show graphs showing the results of XRD analyses for positive electrode active materials prepared according to various Examples of the present invention.
Figure 11:
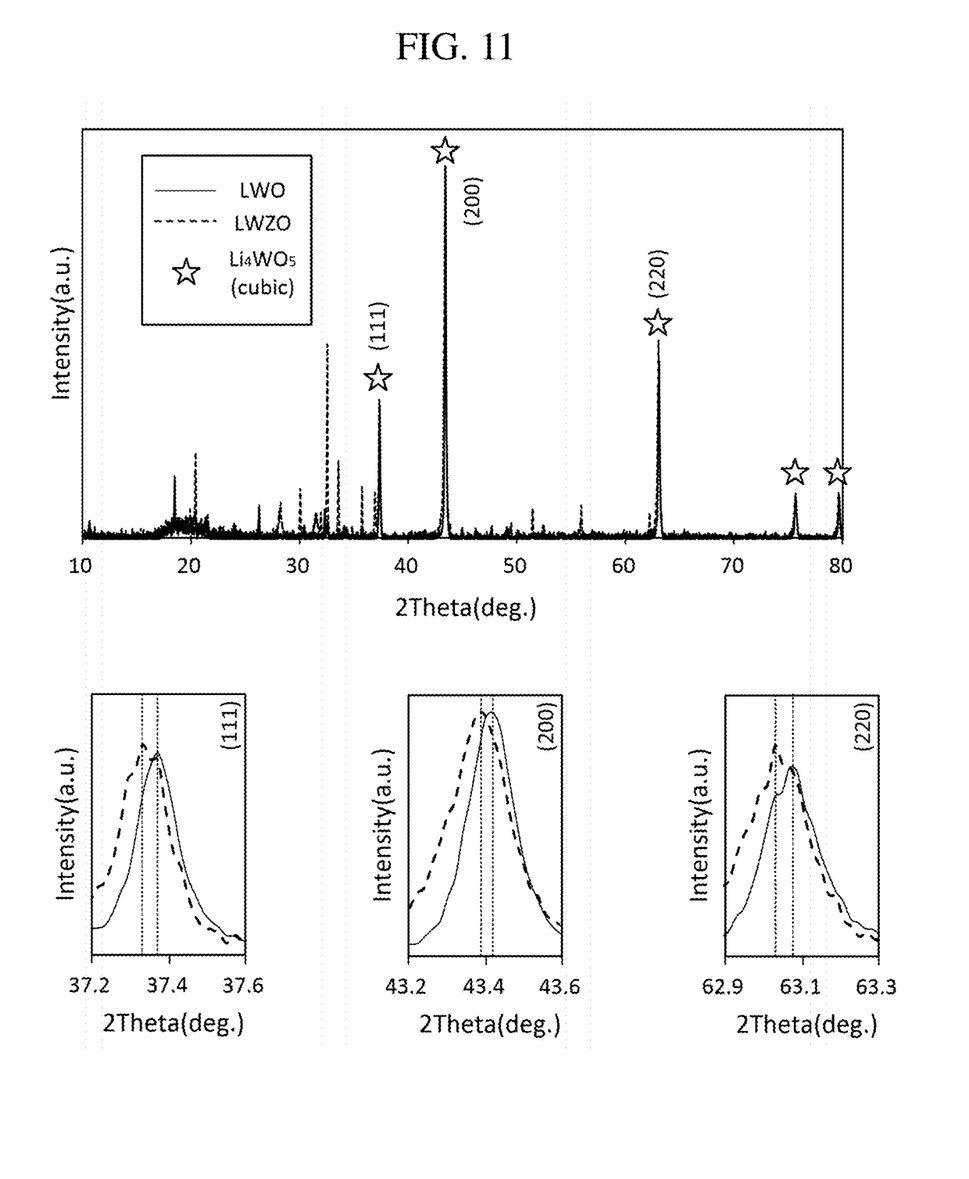
Figure 12:
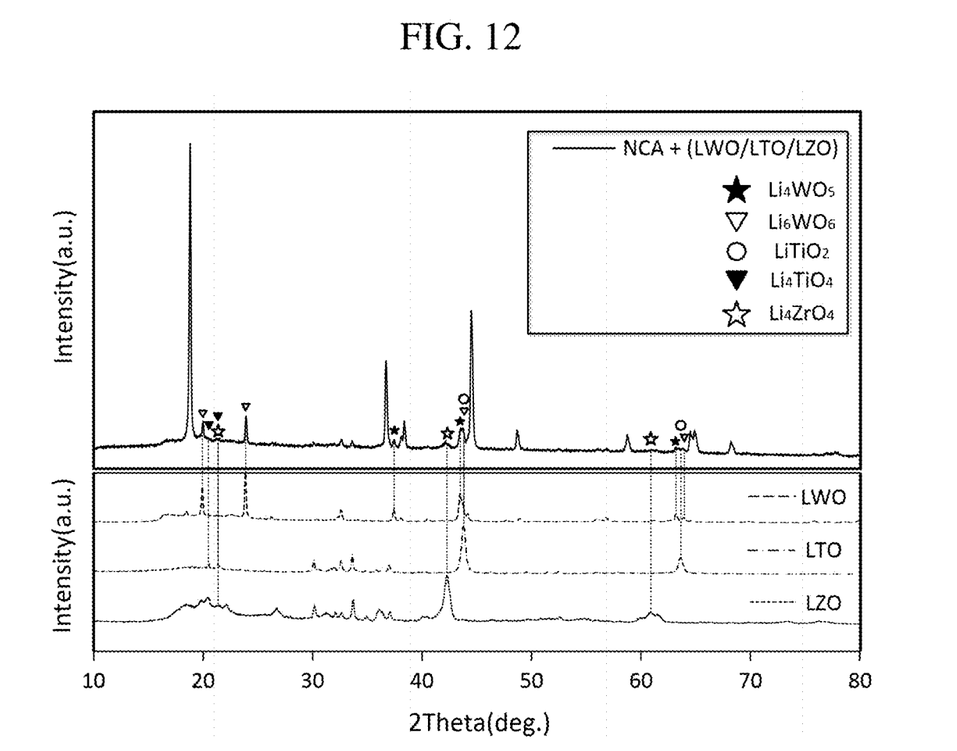

FIGS. 10 to 12 are graphs showing the results of XRD analyses for positive electrode active materials prepared according to Examples 5 to 7.

Referring to FIG. 10, characteristic peaks corresponding to the lithium alloy oxide $Li_4WO_5$ of the positive electrode active materials were confirmed, and particularly, as a (220) peak is not shifted, but (111) and (200) peaks are specifically shifted to a low angle, it is confirmed that there is a heterogeneous lithium alloy oxide in which tungsten in the lattice structure formed by $Li_4WO_5$ is partially substituted with Ti.

In addition, referring to FIG. 11, characteristic peaks corresponding to the lithium alloy oxide $Li_4WO_5$ of the positive electrode active materials were confirmed, and particularly, as (111), (200) and (220) peaks are specifically shifted to a low angle, it is confirmed that there is a heterogeneous lithium alloy oxide in which tungsten in the lattice structure of $Li_4WO_5$ is partially substituted with Zr.

Referring to FIG. 12, it can be confirmed that a positive electrode active material having an NCA composition is formed, and there are peaks corresponding to $Li_4WO_5$, $Li_6WO_6$, $LiTiO_2$, $Li_4TiO_4$ and $Li_4ZrO_4$ in the positive electrode active material.

(4) Measurement of Unreacted Lithium of Positive Electrode Active Material

The measurement of unreacted lithium in each of the positive electrode active materials prepared according to the Examples and Comparative Examples was performed with an amount of 0.1M HCl used until pH 4 by pH titration. First, 5 g of each of the positive electrode active materials prepared according to the Examples and Comparative Examples was added to 100 mL of DIW, stirred for 15 minutes and filtered. 0.1 M HCl was added to 50 mL of the filtered solution, and an amount of HCl consumption according to pH change was measured to determine Q1 and Q2, and thereby, unreacted LiOH and $Li_2CO_3$ were calculated.

M1=23.95 (LiOH Molecular weight)
M2=73.89 ($Li_2CO_3$ Molecular weight)
SPL Size=(Sample weight×Solution Weight)/Water Weight
LiOH (wt %)=[(Q1−Q2)×C×M1×100]/(SPL Size×1000)
$Li_2CO_3$ (wt %)=[2×Q2×C×M2/2×100]/(SPL Size×1000)

The measurement results of unreacted lithium obtained by the above equations are shown in Table 1 below.

TABLE 1

| Classification | LiOH (ppm) | $Li_2CO_3$ (ppm) |
|---|---|---|
| Example 1 | 3,940 | 6,256 |
| Example 2 | 5,306 | 6,982 |
| Example 3 | 5,137 | 7,050 |
| Example 4 | 4,985 | 7,438 |
| Example 5 | 5,573 | 6,781 |
| Example 6 | 4,635 | 6,411 |
| Example 7 | 2,762 | 5,309 |
| Comparative Example 1 | 10,590 | 6,440 |
| Comparative Example 2 | 6,758 | 6,428 |
| Comparative Example 3 | 7,100 | 6,324 |
| Comparative Example 4 | 8,590 | 6,894 |
| Comparative Example 5 | 9,892 | 6,357 |

Referring to the results shown in Table 1, it can be confirmed that, in the positive electrode active materials prepared according to the Examples, compared to those of the Comparative Examples, residual lithium amounts are greatly reduced.

Experimental Example 2

(1) Manufacture of Lithium Secondary Battery 94 wt % of each of the positive electrode active materials prepared according to the Examples and Comparative Examples, 3 wt % of carbon black and 3 wt % of a PVDF binder were dispersed in 30 g of N-methyl-2-pyrrolidone (NMP), thereby preparing a positive electrode slurry. The positive electrode slurry was applied and dried on a positive electrode current collector, which is an aluminum (Al) thin film, having a thickness of 15 μm, and subjected to roll pressing, thereby preparing a positive electrode. A loading level of the positive electrode was 10 mg/cm², and an electrode density was 3.2 g/cm³.

For the positive electrode, a lithium metal was used as a counter electrode, and an electrolyte solution was prepared by adding 1.15M LiPF$_6$ to a solvent in which ethylene carbonate (EC), ethyl methyl carbonate (EMC) and dimethyl carbonate (DMC) were mixed in a volume ratio of 2:4:4.

A lithium secondary battery (coin cell) was manufactured by forming a battery assembly by interposing a separator consisting of a porous polyethylene (PE) film between the positive electrode and a negative electrode, and injecting the electrolyte solution thereinto.

(2) Evaluation of Capacity Characteristics of Lithium Secondary Battery

One cycle of charging was performed on the manufactured lithium secondary battery (coin cell) by charging until 4.25 V with a constant current (CC) of 0.15 C at 25° C., charging with a constant voltage (CV) of 4.25 V until a charge current becomes 0.05 mAh. Afterward, a discharge capacity of the lithium secondary battery at the first cycle was measured after being allowed to stand for 20 minutes, and discharging with a constant current of 0.1 C until 3.0 V. The charge capacity, discharge capacity and charge/discharge efficiency in the first charging/discharging are shown in Table 2 below.

TABLE 2

| Classification | Charge capacity (mAh/g) | Discharge capacity (mAh/g) | Charge/discharge efficiency (%) |
|---|---|---|---|
| Example 1 | 233.6 | 207.1 | 88.7% |
| Example 2 | 233.9 | 211.4 | 90.4% |
| Example 3 | 233.5 | 207.5 | 88.9% |
| Example 4 | 233.9 | 211.6 | 90.5% |
| Example 5 | 233.8 | 211.1 | 90.3% |
| Example 6 | 233.8 | 211.0 | 90.3% |
| Example 7 | 233.7 | 211.5 | 90.5% |
| Comparative Example 1 | 233.6 | 205.4 | 87.9% |
| Comparative Example 2 | 233.5 | 204.2 | 87.4% |
| Comparative Example 3 | 233.6 | 204.5 | 87.5% |
| Comparative Example 4 | 233.9 | 203.9 | 87.2% |
| Comparative Example 5 | 233.2 | 204.1 | 87.5% |

Referring to the results of Table 2, it can be confirmed that the lithium secondary batteries using the positive electrode active materials prepared according to the Examples are improved in charge/discharge efficiency and capacity characteristics, compared to the lithium secondary batteries using the positive electrode active materials prepared according to the Comparative Examples.

(3) Evaluation of Stability of Lithium Secondary Battery

The lithium secondary batteries (coin cells) were subjected to 100 cycles of charging/discharging in the range of driving voltage from 3.0 to 4.25 V with a constant current (CC) of 1 C at 25° C. Accordingly, after 100 cycles of charging/discharging at room temperature, cycle capacity retention, which is a ratio of discharge capacity at the 100$^{th}$ cycle to the initial capacity, was measured.

In addition, to confirm the high-temperature storage characteristics of the lithium secondary battery, a resistance was measured by charging the battery charged/discharged at 25° C. on the basis of SOC 100%, and then, after storage at 60° C. for 7 days, a resistance was measured to confirm the variation of the resistance.

The measurement results are shown in Table 3 below.

TABLE 3

| Classification | Capacity retention (%) | Resistance before high-temperature storage (Ω) | Resistance after high-temperature storage (Ω) |
|---|---|---|---|
| Example 1 | 87.5% | 5.2 | 24.7 |
| Example 2 | 87.8% | 4.3 | 27.5 |
| Example 3 | 88.6% | 4.2 | 33.8 |
| Example 4 | 90.0% | 2.9 | 19.9 |
| Example 5 | 90.1% | 3.0 | 16.8 |
| Example 6 | 91.8% | 3.0 | 11.7 |
| Example 7 | 92.1% | 2.8 | 10.3 |
| Comparative Example 1 | 82.6% | 3.4 | 87.0 |
| Comparative Example 2 | 81.5% | 3.1 | 88.8 |
| Comparative Example 3 | 81.8% | 2.2 | 90.0 |
| Comparative Example 4 | 82.7% | 2.5 | 87.4 |
| Comparative Example 5 | 82.4% | 2.8 | 88.9 |

Referring to the results of Table 3, it can be confirmed that the lithium secondary batteries using the positive electrode active materials prepared according to the Examples have excellent capacity retention and a small variation in the resistance before and after high-temperature storage, compared with the lithium secondary batteries using the positive electrode active materials prepared according to the Comparative Examples.

Positive electrode active materials according to various embodiments of the present invention include a lithium alloy oxide existing at least a part of a) the interface between primary particles constituting a lithium composite oxide and b) the surface of a secondary particle formed by agglomerating the primary particles, and thus structural stability can be increased.

Accordingly, when positive electrodes including the positive electrode active materials according to various embodiments of the present invention are used as those of lithium secondary batteries, high-temperature storage stability and lifespan characteristics can be more improved.

While the present invention has been described with reference to the accompanying drawings, the present invention is not limited with reference to the examples disclosed herein and the accompanying drawings, and it is obvious that various modifications may be achieved by those of ordinary skill in the art within the range of the technical spirit of the present invention. In addition, although the examples of the present invention have been described and the effects according to the configuration of the present invention are not explicitly described, it should be appreciated that predictable effects should also become apparent by the configuration.

What is claimed is:
1. A positive electrode active material, comprising:
a lithium composite oxide comprising primary particles and secondary particles formed by agglomerating the primary particles; and
at least one lithium alloy oxide existing at least at a part of a) the interface between the primary particles and b) the surface of the secondary particle;

wherein the lithium alloy oxide has a peak in which at least one of peaks specific to the lithium tungsten oxide represented by Formula 2 below is shifted toward a low angle in X-ray diffraction:

$$Li_dW_eO_f \qquad \text{[Formula 2]}$$

(wherein, $0<d\leq6$, $0<e\leq6$, $0<f\leq10$).

2. The positive electrode active material of claim 1, wherein the primary particles forming the lithium composite oxide are represented by Formula 6 below:

$$Li_wNi_{1-(x+y+z)}Co_xM3_yM4_zO_2 \qquad \text{[Formula 6]}$$

(wherein, M3 is at least one selected from Mn and Al, M4 is at least one selected from Ti, Zr, Mg, V, B, Mo, Zn, Nb, Ba, Ta, Fe, Cr, Sn, Hf, Ce, W, Nd and Gd, $0.5\leq w\leq1.5$, $0\leq x\leq0.50$, $0\leq y\leq0.20$, and $0\leq z\leq0.20$).

3. The positive electrode active material of claim 1, wherein the lithium alloy oxide has a peak in which at least one of (110), (200) and (220) peaks specific to the lithium tungsten oxide is shifted toward a low angle in X-ray diffraction.

4. The positive electrode active material of claim 1, wherein the lithium alloy oxide exhibits a concentration gradient which decreases from the surface to the center of the secondary particle.

5. The positive electrode active material of claim 1, wherein the lithium allow oxide has a lattice structure that is doped with at least one dopant in the lithium tungsten oxide.

6. The positive electrode active material of claim 1, wherein the lithium allow oxide has a lattice structure in which tungsten in the lattice structure formed by the lithium tungsten oxide is partially substituted with at least one dopant.

7. The positive electrode active material of claim 1, wherein the lithium alloy oxide represented by Formula 1-1 below:

$$Li_a(W_{1-y}M1_y)_bO_c \qquad \text{[Formula 1-1]}$$

(wherein, M1 includes at least one selected from Ti, Zr, Mg, V, B, Mo, Zn, Nb, Ba, Ta, Fe, Cr, Sn, Hf, Ce, Nd and Gd, $0<a\leq6$, $0<b\leq6$, $0<c\leq10$, and $0<y\leq0.50$).

8. The positive electrode active material of claim 1, further comprising:
at least one alloy oxide represented by Formula 3 below and existing at least a part of a) the interface between the primary particles and b) the surface of the secondary particle:

$$Li_gM2_hO_i \qquad \text{[Formula 3]}$$

(wherein, M2 is at least one selected from Ti, Zr, Mg, V, B, Mo, Zn, Nb, Ba, Ta, Fe, Cr, Sn, Hf, Ce, Nd and Gd, $0\leq g\leq6$, $0<h\leq6$, and $0<i\leq10$).

9. The positive electrode active material of claim 8, wherein the alloy oxide exhibits a concentration gradient which decreases from the surface to the center of the secondary particle.

10. A lithium secondary battery comprising a positive electrode including the positive electrode active material according to claim 1.

* * * * *